(12) United States Patent
Nydegger et al.

(10) Patent No.: US 11,680,553 B2
(45) Date of Patent: Jun. 20, 2023

(54) SYSTEM AND METHOD FOR BALANCING OPERATIONAL SYSTEMS OF AN ELECTRIC GENERATOR

(71) Applicants: Neil K. Nydegger, Rancho Santa Fe, CA (US); Paul F. Mlakar, Vicksburg, MS (US); David L. Nydegger, Oceanside, CA (US)

(72) Inventors: Neil K. Nydegger, Rancho Santa Fe, CA (US); Paul F. Mlakar, Vicksburg, MS (US); David L. Nydegger, Oceanside, CA (US)

(73) Assignee: Gravitas E2P Inc., Rancho Santa Fe, CA (US)

( * ) Notice: Subject to any disclaimer, the term of this patent is extended or adjusted under 35 U.S.C. 154(b) by 24 days.

(21) Appl. No.: 17/527,959

(22) Filed: Nov. 16, 2021

(65) Prior Publication Data

US 2022/0186703 A1    Jun. 16, 2022

Related U.S. Application Data

(63) Continuation-in-part of application No. 17/118,012, filed on Dec. 10, 2020, now Pat. No. 11,268,487.

(51) Int. Cl.
*F03B 17/04* (2006.01)
*H02K 35/02* (2006.01)

(52) U.S. Cl.
CPC .............. *F03B 17/04* (2013.01); *H02K 35/02* (2013.01)

(58) Field of Classification Search
CPC ................................ F03B 17/04; H02K 35/02
See application file for complete search history.

(56) References Cited

U.S. PATENT DOCUMENTS 4,500,827 A    2/1985    Merritt et al.

*Primary Examiner* — Viet P Nguyen
(74) *Attorney, Agent, or Firm* — Neil K. Nydegger

(57) ABSTRACT

A system and method for harvesting electric energy from the earth's gravitational field includes a pneumatic, potential energy (PE) system which cumulatively generates a volume of compressed air with an energy equal to PE, during a predetermined duty cycle. This energy can then be released as an instantaneous burst of energy in the next consecutive duty cycle. Also included is an electro-magnetic system which continuously generates kinetic energy (KE) as a shuttle falls under the influence of gravity during each duty cycle. An interface between the two systems is provided by a water column that separates the two systems yet allows them to be interactive. Specifically, the burst of PE manipulates the water column to maintain its integrity as the shuttle uses the water column as a water pathway for a return to the shuttle's start point under the influence of its buoyancy.

8 Claims, 8 Drawing Sheets

SYSTEM AND METHOD FOR BALANCING OPERATIONAL SYSTEMS OF AN ELECTRIC GENERATOR

This application is a continuation-in-part of application Ser. No. 17/118,012, filed Dec. 10, 2020, which is currently pending. The contents of application Ser. No. 17/118,012 are incorporated herein by reference.

FIELD OF THE INVENTION

The present invention pertains generally to systems that operate by using renewable energy from the earth's gravitational field. More particularly, the present invention pertains to systems and methods for employing the effect of gravity on a power shuttle as it falls through air to generate electricity, and the effect of the shuttle's buoyancy as it rises through water to an elevated start point for a subsequent work cycle. The present invention is particularly, but not exclusively, useful for maintaining two different water levels in a bi-level tank to establish the water portion of an air/water pathway for a power shuttle during its work cycle.

BACKGROUND OF THE INVENTION

A displacement device disclosed for the present invention is intended primarily, but not exclusively, for use as a mechanism to operate a bi-level tank. As envisioned for the present invention, a bi-level tank will preferably have a structure such as is disclosed in U.S. patent application Ser. No. 16/788,683, which was filed on Feb. 12, 2020, by Townsend for an invention entitled "Machine for Driving an Electric Generator" (hereinafter referred to as the "Machine").

In overview, as disclosed in the '683 Applications, the Machine moves a power shuttle(s) along a vertically oriented air/water pathway. On the air portion of the pathway, the power shuttle engages with a linear electric generator as it falls under the influence of gravity to generate electric energy. The power shuttle then falls into a bi-level water tank where it is directed along the water portion of the pathway. In the water tank, the power shuttle is raised by its buoyancy back to an elevated start point where it begins another cycle.

Briefly, the bi-level tank of the Machine includes both an upper "tower tank" and a lower "transfer tank". Different water levels for the upper and lower tanks are maintained by the operation of a valving system in the bi-level tank. This valving system also allows the tanks to be either connected in fluid communication with each other or, alternatively, isolated from each other. Importantly, during these change-over operations, the tanks are connected in fluid communication with each other only during the time that is needed for a power shuttle to complete its transit through the lower "transfer tank". Once the shuttle leaves the lower tank and enters the upper tank, the upper and lower tanks are again isolated from each other. During the event, water levels in the respective upper and lower tanks must be controlled. For the present invention, this control is established by a water displacement device that accounts for the passage of a power shuttle through the lower tank.

An operation of a displacement device for the Machine will be best appreciated by considering what must be accomplished during the passage of a power shuttle through the lower tank. Of particular importance, is the need for control over the water level in the lower tank. Specifically, as a power shuttle enters into the lower tank, the upper and lower tanks are isolated from each other and the water level in the lower tank rises. After the shuttle enters the lower tank, the access port into the lower tank is sealed and closed behind the power shuttle. At the same time, the valve between the upper and lower tanks is opened so the power shuttle can pass along an unobstructed water pathway into the upper tank. A consequence here is that water from the upper tank replaces the water volume previously occupied by the power shuttle in the lower tank. The water level in the lower tank, however, does not drop because access into the lower tank has remained closed. Further, as the power shuttle transits the lower tank, the displacement device is activated to displace an additional volume of water from the lower tank and move it into the upper tank. However, once the shuttle has vacated the lower tank this additional water volume returns into the lower tank. The valving system in the bi-level tank is then operated to isolate the lower tank from the upper tank. The displacement device can then be deactivated to lower the water level in the lower tank for receiving the next shuttle.

As noted above, to control the separate water levels of the upper and lower tanks in the bi-level tank, it is necessary for the displacement device to cyclically lift a large volume of water from the lower tank, and into the upper tank. This lifting is done under very high pressures from water in the upper tank, and it must be accomplished within a relatively short period of time (e.g., several seconds). In effect, the work required to lift this water is the preponderance of the input power required to operate the Machine. On the other hand, as a separate consideration, the output power of the Machine comes from an interactive engagement of the power shuttle with a linear electric generator as the shuttle falls through air outside the bi-level tank.

Both the input and output power requirements for operating the Machine will be best appreciated by identifying the physical aspects that are involved with its operation. Of particular importance is the relationship between the input power that is provided by the displacement device, and the output power that is generated by a power shuttle. In this context, the forces of gravity and buoyancy dominate for determining the resultant output power.

First, with specific regard to the power shuttle and the output power of the Machine, the relationship between gravity and buoyancy is important. Buoyancy is a force that does not nullify the force of gravity. Buoyancy and gravity do, however, act on the power shuttle in directly opposite directions. This relationship is typically quantified by a so-called buoyancy factor B. Mathematically, B equals the weight (mass) of an object relative to the weight (mass) of a same volume of the medium (e.g., water or air) in which it is submerged. In the context of the present invention, a power shuttle will have a different buoyancy factor B when falling through air while engaged with a linear generator, than when it is submerged in the bi-level tank of the Machine. For purposes of the present invention, the shuttle's buoyancy factor B in air is considered negligible (i.e., $B \gg 1$). In water, however, for disclosure purposes only, B is considered equal to 0.7.

Another physical consideration of great importance for the present invention is the First Law of Thermodynamics. Simply stated, the First Law requires that the total energy in a closed system can be neither created nor destroyed. The present invention, however, is not a closed system and therefore the First Law is not a concern. This is so merely because the Machine requires an input power for its operation.

As a practical matter, it happens that the present invention incorporates two different energy systems. One system, in effect, drives the other. Specifically, one energy system involves the work that is done by a power shuttle to generate an output power under the influence of the forces of gravity and buoyancy. The other involves the work that is cyclically done by the displacement device to reconfigure the bi-level tank with a water pathway for the power shuttle as it transits through the bi-level tank. Neither the first energy system nor the second energy system can be considered as a closed system.

Although they operate separately, both the first and second energy systems can be evaluated within the same time interval $\Delta t$. For purposes of the present invention, $\Delta t$ is defined by the interval of time a shuttle is engaged with a linear generator. As disclosed in detail below, $\Delta t$ is also the time interval required for a displacement device to complete its duty cycle. For this purpose, $\Delta t$ is defined in the operational context of an operation of the displacement device and an operation of the shuttle. Thus, $\Delta t$ must be considered in the operational context of both the power shuttle and the displacement device.

For purposes of this disclosure, a volume of water, $V_w$, in the bi-level tank is determined based on the displacement volume of a power shuttle, $V_s$. Thus, they are equal to each other ($V_w = V_s$). The mass, $m_s$, of the shuttle volume $V_s$, however, is less than the water mass $m_w$ of the water volume $V_w$. This is quantified by the shuttle's buoyancy factor B (i.e., $m_s = Bm_w$). In accordance with this relationship, the mass of the water volume $V_w$ will hereinafter sometimes be referred to merely as "m", and the mass of the shuttle will be referred to as "Bm". It then follows that for the present invention, the energy in a volume of water will be equal to mgH, where g is the effect of gravity and H is a head height distance which is established by the water level in the upper tank of the bi-level tank. Similarly, the energy in a power shuttle will be considered equal to or less than BmgH.

Power is defined as work, U, per unit of time. Thus, the input power to operate the displacement device is $U/\Delta t = mgH/\Delta t$, and the output power generated by a power shuttle is $BmgH/\Delta t$.

For the present invention, power is an important consideration. As is well known, commercial machines that generate electric energy are typically rated on their output power expressed as watts, where watts are defined as joules per second. In the context of the present invention, however, it is necessary to also consider time intervals that are longer than a second.

Recall the definitions of work and energy. Energy is defined as the capacity to do work, and work is a manifestation of energy. Both energy and work have the same units (e.g., ft-lb), and accordingly they are used here interchangeably. Power, on the other hand, is the time rate of doing work. Thus, where power is concerned, time considerations are essential.

For the Machine of the present invention, its output power $P_o$ is generated from the kinetic energy KE that is harvested from a falling shuttle during the shuttle's engagement with a linear generator (KE is the energy of motion). This engagement, however, will typically occur over an extended time interval, $t_e$, e.g., for an X number of seconds. Consequently, for purposes of this disclosure, when power values for the Machine are considered, they are reconciled for a one second time interval as well as for an X second time interval.

With time as a consideration, an operation of the Machine and its components are best understood with reference to a common duty cycle having a determinable time interval $t_e$. Specifically, to is the time duration of a shuttle engagement with the linear generator. Moreover, there are several different power operations for the Machine, all of which are based on $t_e$. Machine components for performing these operations include a pneumatic system that provides compressed air for an overall input power $P_i$ for the Machine. This input operation is based on a potential energy (PE) requirement. Another operation provides the output power $P_o$ of the Machine, and it is based on the kinetic energy (KE) capability of a falling shuttle.

With the above in mind, it is an object of the present invention to provide a displacement device that will maintain different water levels in a bi-level tank for the purpose of establishing a water pathway on which a power shuttle can transit by its buoyancy to an elevated start (launch) point from where it can be dropped to generate electricity under the influence of gravity. It is another object of the present invention to provide a system by which the output power of the Machine is developed by an output energy system, and the input power for running the Machine is developed by a separate input energy system. Still another object of the present invention is to coordinate the potential energy (PE) power requirement of the Machine, with its kinetic energy (KE) power capability, to thereby provide a useful net output power $P_o$ for the Machine. Yet another object of the present invention is to provide an apparatus for driving a Machine that will generate electricity under the influence of the forces of gravity and buoyancy, and which is easily manufacturable, is simple to use, and is cost effective.

SUMMARY OF THE INVENTION

A displacement device is provided for driving a Machine that has a pneumatic component, a mechanical component, an hydraulic component and an electromagnetic component. Of these components, the focus for the displacement device of the present invention is on the combination of the pneumatic and mechanical components which establish an input energy system.

Structurally, the displacement device includes, in sequence, a skirt (enclosure), a piston plate, a bellows, an exhaust chamber, a receiver tank for holding high-pressure compressed air, and an air compressor. Functionally, compressed air from the receiver tank is pulsed through the bellows to push upwardly against the underside of the piston plate, and thereby expand the skirt. The pulse of compressed air below the piston plate is then exhausted to the atmosphere to lower the piston plate for a next duty cycle.

The skirt (enclosure) of the displacement device is preferably made of a flexible, non-stretchable, material which will allow it to expand radially outwardly from a central axis that is defined by the cylindrical shape of the skirt. The upper end of the skirt is affixed to an inside wall of a water tank, and the lower end of the skirt is attached to the perimeter of the piston plate. In this combination, a skirt volume $V_{sk}$ is created within the skirt between the inside wall of the water tank and the piston plate. This skirt volume $V_{sk}$ is then filled with water having a predetermined pressure H. Importantly, both the skirt volume $V_{sk}$ and the pressure H remain constant during an operation of the displacement device.

In detail, the piston plate has an upper surface with a circular flat plate area A that is surrounded by the plate's perimeter. The underside of the piston plate also has an area A that is surrounded by the plate's perimeter. In its connection with the skirt, the piston plate defines an axis which is essentially coaxial with the central axis of the skirt.

The cylindrical shaped bellows of the displacement device has a hollow interior and open ends. The upper end of the bellows is connected to the perimeter of the piston plate with the underside of the piston plate facing into the hollow interior of the bellows. Also, the open lower end of the bellows is connected directly in fluid communication with the exhaust chamber. In this combination, the bellows is coaxially aligned with the piston plate and due to the axially directed flexibility of the bellows, the piston plate is able to move in an axial direction either away from or toward the exhaust chamber. Specifically, it is to be appreciated that as the piston plate is raised to move away from the exhaust chamber and toward the skirt, it will reconfigure the skirt with a radially outward expansion. On the other hand, when the piston plate is lowered to move in the direction toward the exhaust chamber, it will reconfigure the skirt to a generally cylindrical shape.

During sequential duty cycles of the displacement device, an air compressor operates continuously to maintain an elevated pressure for compressed air in the receiver tank. Importantly, this elevated pressure is within a pressure range equal to H'±, where H'± is greater than the pressure H in the skirt volume $V_{sk}$ noted above. This is important because during each duty cycle of the displacement device, a predetermined volume of compressed air $\Delta V_c$ is pulsed from the receiver tank and into the exhaust chamber. From the exhaust chamber, this pulse of compressed air is directed onward through the bellows and against the underside of the piston plate to perform the work that is required by the piston plate to lift the predetermined volume of water $V_w$ in the bi-level tank. Specifically, as noted above, the volume of water to be lifted in the bi-level tank $V_w$ is dimensionally the same as the volume of a power shuttle $V_s$. Furthermore, the volume of compressed air $\Delta V_c$ that is pulsed from the receiver tank at a pressure H'± will also be equal to the volume $V_s$ of the power shuttle ($\Delta V_c = V_w = V_s$).

The exhaust chamber of the displacement device is essentially the combination of a pressure valve and an exhaust valve which are located at the lower end of the bellows. Operationally, these valves are operated separately to be selectively OPEN or CLOSED in accordance with a predetermined schedule. According to this schedule, an elevated air pressure H' is established in the interior of the bellows against the underside of the piston plate when the pressure valve is OPEN and the exhaust valve is CLOSED. On the other hand, when the pressure valve is CLOSED and the exhaust valve is OPEN, the previously increased pressure against the underside of the piston plate is decreased to atmospheric pressure as air is exhausted from the exhaust chamber.

As mentioned above in the context of the Machine, the general purpose of the displacement device is to create and maintain a water pathway for a power shuttle through the Machine's bi-level tank. This water pathway, however, is only a portion of a closed loop air/water pathway that is followed by a power shuttle as it generates output electrical power for the Machine. It is an important consequence of the present invention that from an energy/power perspective, separate evaluations of input power and output power are possible. This is so because the displacement device and the power shuttle interact independently of each other in the water of the bi-level tank, during a same duty cycle $\Delta t$.

As a separate consideration from an evaluation of the output power, the duty cycle $\Delta t$ of the displacement device to generate input power can be considered as having three phases. These phases are: i) a power phase during which the piston plate works to lift a volume of water; ii) a holding phase wherein the piston plate is held stationary at its raised location; and iii) an exhaust phase during which the piston plate is lowered to begin another duty cycle for the displacement device. It is important to keep in mind that this entire operation of the displacement device is accomplished absent any direct contact between the displacement device and a power shuttle.

When considering an operation of the displacement device for the Machine, it is helpful to understand the assumptions that have been made. Specifically, these assumptions are:

1. No further work is done by the piston plate during the duty cycle $\Delta t$, after it has lifted water;
2. There is no transfer of energy between the displacement device and the power shuttle in the bi-level tank; and
3. A power evaluation of dynamic considerations in the Machine, rather than static, steady-state conditions, is appropriate for evaluating the Machine's efficiency.

When considering energy and power, the work to be done by the piston plate during the duty cycle time interval $\Delta t$ of the displacement device equals mgH. Recall, the mass of water m is determined by the volume of water $V_w$ that is being lifted, g is the acceleration due to gravity, and H is the head height of the tower tank in the bi-level tank of the Machine. Also note, the head height H of the upper tank is the same H as is established for water in the skirt volume $V_{sk}$ of the displacement device.

To do the work of the displacement device, the piston plate must be raised through a distance s, where $sA=V_w=V_s$. After being raised, the piston plate is then held stationary for a short interval of time, until the shuttle has time to leave the lower tank and enter the upper tank. The piston plate is then lowered and reset for its next duty cycle. Although work is required to raise the piston plate, work is not required as the piston plate is held stationary, nor is work required as the piston plate is lowered to restart the next duty cycle.

As noted above, a receiver tank for holding compressed air at a pressure H'± is selectively connected in fluid communication with the lower side of the piston plate. More specifically, this connection is provided by valves of the exhaust chamber that either; i) establish a direct pathway from the receiver tank to the lower side of the piston plate, or ii) separate the receiver tank from the exhaust chamber while compressed air in the exhaust chamber and bellows is held and then exhausted into the atmosphere. It is when there is an open pathway from the receiver tank to the piston plate that a pulse of compressed air can be taken from the receiver tank at a pressure H'±>H to raise the piston plate. As noted above, the work required to raise the piston plate is equal to mgH. Importantly, this work is done during only a portion ½Δt of the displacement device duty cycle Δt, where 1/x<1.

By definition, power is the time-rate of doing work. For purposes of the present invention, power requirements are considered separately for the input energy system and the output energy system. In the input energy system, consideration is given to the air compressor, the receiver tank, and the piston plate of the displacement device. The air compressor must do work at least equal to mgH during Δt. Thus, to maintain the pressure H'± in the receiver tank, the air compressor must be operated continuously at a power equal to or greater than mgH/Δt. Recall, the piston plate of the displacement device must do the same amount of work mgH as the air compressor. The piston plate, however, does its work in response to pulses of compressed air from the receiver tank during only a portion of the duty cycle Δt (e.g., ½Δt). Specifically, as noted above, the piston plate works only as it lifts water in the bi-level tank. Thus, the piston plate operates with a power equal to $mgH/\frac{1}{2}\Delta t$. Stated differently, although the air compressor and the piston plate each do the same amount of work (mgH), the air compressor can work with less power for a longer period of time.

For the input energy system and for the output energy system, the same period of time $\Delta t$ is considered. The work harvested by the linear generator from the power shuttle, however, will be dependent on the buoyancy factor B of the power shuttle. Accordingly, the work harvested from the power shuttle during $\Delta t$ is BmgH, and the output power will thus be $BmgH/\Delta t$.

The benefit of considering the air compressor with the piston plate, as the means for providing input power for the Machine, is three-fold. For one, although they do the same amount of work, the air compressor and the piston plate work through different intervals of time during the duty cycle $\Delta t$. For another, the work done by the air compressor and the receiver tank is directly transferred as work for operating the piston plate. For another, both the air compressor and the power shuttle work continuously during the same duty cycle $\Delta t$.

During the design phase of construction for a Machine of the present invention, several variables are to be determined or selected. These include: i) desired output power, "$P_o$", ii) the time duration "$t_e$" for shuttle engagement with the linear generator, and iii) the mass "$m_w$" for a volume of water that is equivalent to a shuttle volume $V_s$. The values selected for these variables will necessarily be determined by commercial and engineering considerations that are based on the desired output power $P_o$.

In a preferred embodiment of the present invention, the Machine is a combination of two separate but interactive systems. One is a pneumatic system which provides an input power $P_i$ for operating the Machine's displacement device. The other is an electromagnetic system for harvesting energy from the earth's gravitational field for use as the Machine's electrical output power $P_o$. The ways in which $P_i$ and $P_o$ are generated are distinctively different.

Energy of the input power, $P_i$, for operating the Machine is cumulatively generated over time and is then instantaneously discharged. During energy accumulation, which lasts an entire duty cycle, $t_e$, an air compressor provides compressed air to a receiver tank. This input power $P_i$ is then expended as a burst of compressed air in the next successive duty cycle. This is done by a displacement device to accomplish a fixed input work requirement $U_i$. In contrast with the accumulated input power $P_i$, the output power, $P_o$, is constant and continuously available during each of the Machine's duty cycles to do output work, $U_o$.

Structurally, the only connecting medium between the pneumatic input system for $P_i$, and the electromagnetic system for $P_o$ of the Machine is a common body of water, i.e., the bi-level tank. Thus, although they interact with each other, the systems do so independently of each other. Importantly, there are no structural, no pneumatic, no electromagnetic and no hydraulic interactions between operations of the input and output systems of the Machine. Nevertheless, because they are interactive, they must still be compatible. Most importantly they must operationally complement each other during a common duty cycle $t_e$ that, for reasons addressed below, will last an X number of seconds.

An operation of the Machine requires that the integrity of the water volume in the bi-level tank be maintained. This is accomplished by a piston plate in the displacement device which cyclically raises and lowers a water volume in the bi-level tank once during each Machine duty cycle $t_e$. Specifically, the piston plate of the displacement device, which is submerged in the bi-level water tank, is cyclically raised, and lowered to move the water volume up and down during each duty cycle $t_e$. Power for operating the displacement device for this purpose is provided by the pneumatic system.

The pneumatic system for operating the displacement device includes an air compressor and a receiver tank. In combination, the air compressor maintains an elevated air pressure in the receiver thank. The air compressor does this continuously without interruption. In turn, the receiver tank provides the compressed air that is necessary to run the displacement device during each duty cycle. The input work $U_i$ required by the displacement device for this purpose is the same for each duty cycle and, importantly, the power $P_i$ for doing this work can be accomplished as a burst of energy which is much shorter than the duty cycle $t_e$.

Operationally, the pneumatic system drives the piston plate of the displacement device to hydraulically reset the upper and lower water levels of the bi-level tank during each duty cycle. Specifically, when a shuttle enters the lower tank the water level rises in the lower tank. The displacement device is then activated to displace an additional shuttle volume of water from the lower tank and into the tower tank. This raises the water level in the tower tank so that the water levels in both the lower tank and the tower tank have been raised.

A resetting of the water levels occurs in two separate actions. For one, a reset occurs in the lower tank after a shuttle leaves the lower tank and transits into the tower tank. The displacement device is then deactivated and the water level in the lower tank is thereby lowered to its former level. Also, a reset for the tower tank occurs when the shuttle breaches at the top of the tower tank to thereby lower the water level in the tower tank due to the breach. Thus, the bi-level tank is reconfigured to accommodate the next sequential shuttle.

In a preferred embodiment of the present invention, a plurality of shuttles can be employed in tandem. Operationally, timing between shuttles is a key consideration. For example, a multi-shuttle version of the Machine with four shuttles is considered with a shuttle circuit divided into four equal time zones. More specifically, the time zones are successive and are aligned along the entire length of the shuttle circuit. This includes both air and water pathways. Importantly, although the physical lengths of the time zones are not equal, the time duration for each time zone is equal to $t_e$, i.e., the time of engagement between the shuttle and the linear generator.

In sequence, the first time zone is defined while the shuttle is engaged with the linear generator. Successive time zones can then be defined relative to locations within the bi-level tank. For instance, the second time zone will extend from the time the shuttle has disengaged from the linear generator. It will then continue until after the shuttle has been redirected from the lower transfer tank and has entered the tower tank. During, the third time zone the shuttle will remain in the tower tank as it accelerates to its terminal velocity, $v_t$. In the fourth time zone it is important that $v_t$ is sufficient for the shuttle to breach from the tower tank. After breach, the remainder of the fourth time zone can then be controlled for the next successive shuttle to begin its circuit. Specifically, the fourth time zone can be shortened or extended to precisely control the start time for the next shuttle's respective start of a circuit.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 11 is an exemplary representation of the availability of output work $U_o$ during an X second duty cycle to;

FIG. 12 is a representative illustration of a shuttle circuit showing the air and water pathways of the circuit combined in a closed loop of equal time zones along the circuit, where each time zone consecutively accommodates a single shuttle during each duty cycle to;

DESCRIPTION OF THE PREFERRED EMBODIMENTS

Figure 1:
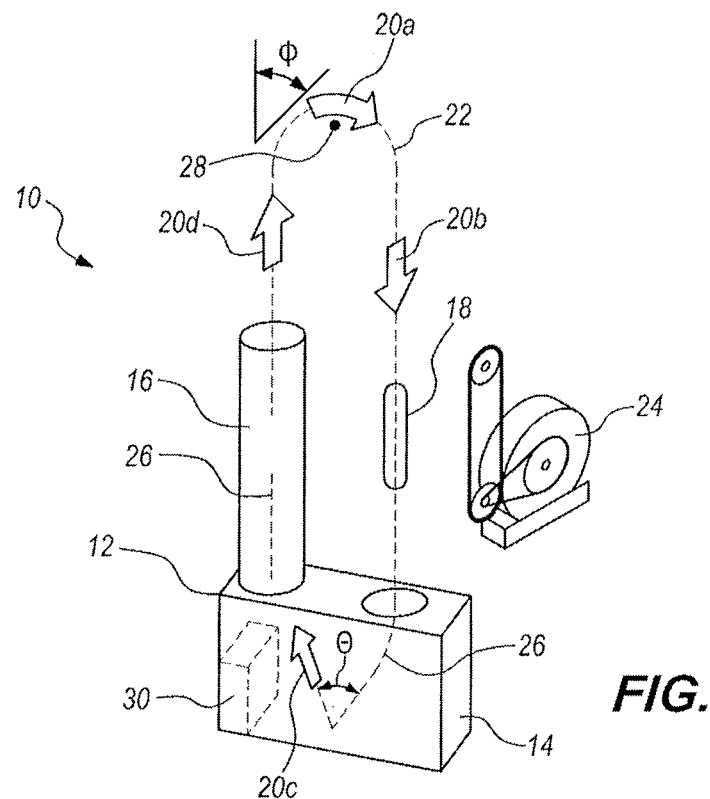
FIG. 1 is a conceptualized perspective view of a Machine for generating electricity in the earth's gravitational field with a submerged displacement device of the present invention shown in phantom for context location purposes only.

Referring initially to FIG. 1, a Machine to be driven by the present invention is shown and generally designated 10. As shown, the Machine 10 includes a bi-level tank 12 which has a lower tank 14 and an upper tank 16 that are connected for selective fluid communication with each other. FIG. 1 also shows a power shuttle 18 that is intended to transit the bi-level tank 12 on a pathway 20 which is indicated by the arrows 20a-d. In more detail, the pathway 20 includes an air portion 22 where the power shuttle 18 falls under the influence of gravity. As it falls the power shuttle 18 engages with an electric generator 24 to generate electric power. FIG. 1 further shows that the pathway 20 also includes a water portion 26. On this water portion 26 of the pathway 20, the shuttle 18 first decelerates and then returns by its buoyancy to an elevated start point 28 where it begins a next cycle. FIG. 1 also shows the intended location for a displacement device 30 of the present invention, i.e., submerged in the lower tank 14 of the bi-level tank 12.

Figure 2:
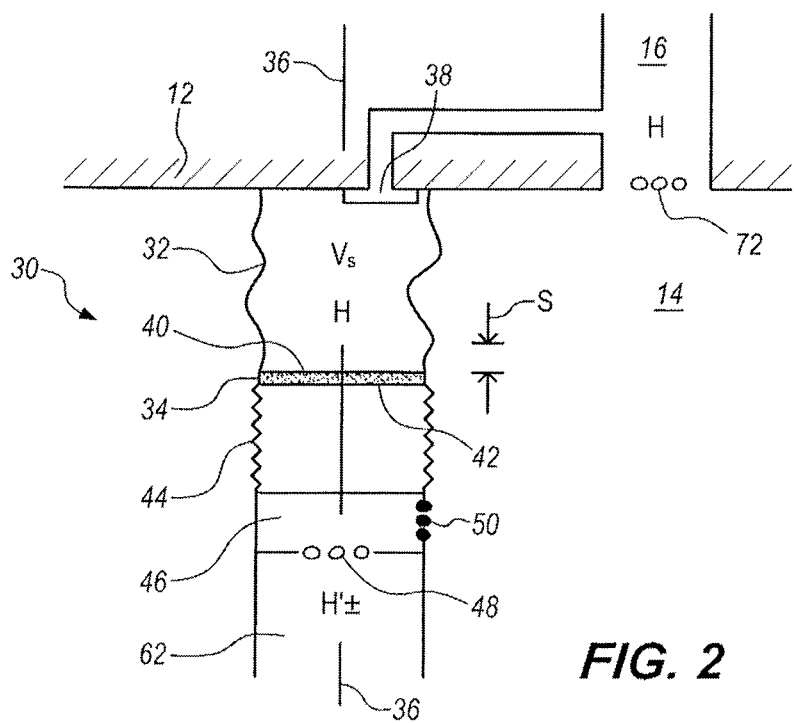
FIG. 2 is a cross section view of a displacement device in accordance with the present invention when configured at the beginning of its duty cycle Δt, wherein the pressure valve is OPEN and the exhaust valve is CLOSED to initiate a duty cycle Δt, at the time $t_0$.

FIG. 2 shows, in a cross-section view, that the displacement device 30 includes a skirt 32 (i.e., enclosure) which is connected between a wall of the bi-level tank 12 and a piston plate 34. Structurally, the skirt 32 is cylindrical shaped with open ends; it is centered on an axis 36; and it is preferably made of a flexible, impervious, non-stretchable material. Within the skirt 32 a skirt volume $V_{sk}$ is established between the bi-level tank 12 and the piston plate 34. An important requirement of the skirt volume $V_{sk}$ is that it maintains a constant volume, at a constant pressure, during an operation of the displacement device 30. As intended for the present invention, the constant pressure equal to H in the skirt volume $V_{sk}$ will be maintained by a pressure regulator 38, wherein H is the head height of water in the upper tank 16.

Still referring to FIG. 2, it is to be appreciated that the piston plate 34 has an upper surface 40 and an underside 42. Both the upper surface 40 and the underside 42 of the piston plate 34 have a substantially same plate area A, and the piston plate 34 is centered on the axis 36 for a coaxial alignment with the skirt 32. As shown, an open end of the skirt 32 is connected to the periphery around the area A on the upper surface 40 of the piston plate 34. Below the piston plate 34, its underside 42 is connected to a bellows 44.

The bellows 44 is a hollow cylindrical shaped structure with open ends. An upper end of the bellows 44 is connected to the periphery around the area A on the underside 42 of the piston plate 34. The lower end of the bellows 44 is connected to an exhaust chamber 46. With its connections between the piston plate 34 and the exhaust chamber 46, the bellows 44 is coaxially aligned with the skirt 32. Thus, with the action of the bellows 44, the piston plate 34 can be moved up and down along the axis 36 through the distance s shown in FIG. 2. For purposes of the present invention, it is important that the distance s be established so that a movement of the piston plate 34 will pass through a volume, sA, that is equal to the volume $V_s$ of a power shuttle 18.

With specific reference to the exhaust chamber 46, FIG. 2 shows that the exhaust chamber 46 essentially includes a pressure valve 48 and an exhaust valve 50. The primary purpose of this exhaust chamber 46 is to control air pressures against the underside 42 of the piston plate 34 by operating the valves 48 and 50 in accordance with a predetermined protocol. In the disclosure provided below, the valves 48 and 50 are represented by three circles. Hereinafter, all OPEN valves are depicted in the Figures as a line of three circles. On the other hand, all CLOSED valves are depicted by three dots.

Figure 3:
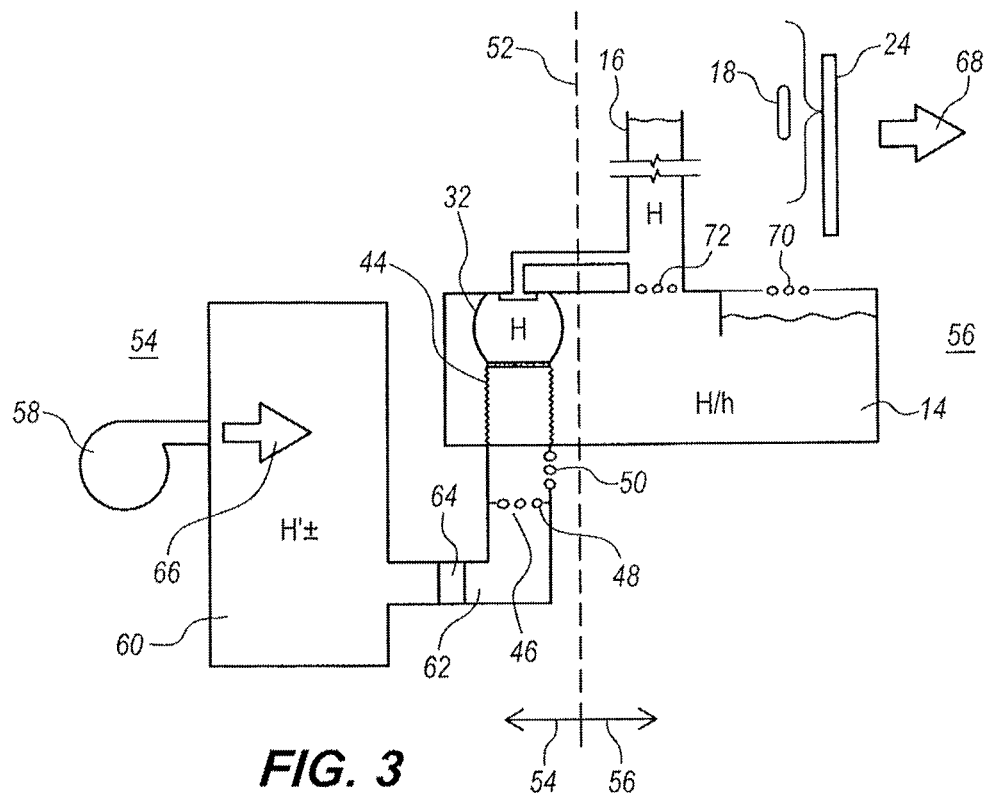
FIG. 3 is a diagrammatic view of components in the Machine, with the components separated into separate input and output energy systems.

FIG. 3 is a depiction of the present invention as two different energy systems, separated by a dashed line 52. To the left of the dashed line 52 is an input energy system generally designated 54, and to the right of the dashed line 52 is an output energy system generally designated 56. For the present invention, although they are interactive, the energy systems 54 and 56 are structurally and functionally considered individually. The only link between the two energy systems 54 and 56 is that both are partially submerged in a same body of water, i.e. the lower tank 14 of the bi-level tank 12. As noted above in the assumptions presented in the Summary of the Invention, the present invention assumes there is no transfer of energy between the input energy system 54 and the output energy system 56.

In FIG. 3, it is seen that the input energy system 54 includes an air compressor 58 that provides compressed air for a receiver tank 60. Further, it is shown that the receiver tank 60 is connected in fluid communication with the exhaust chamber 46 via pressure valve 48. As intended for the present invention, compressed air pressure in the receiver tank 60 is maintained within a pressure range H'± at all times. This pressure range H'± is monitored by a regulator 64 which is connected to, and controls, the operation of the air compressor 58. Specifically, the pressure range H'± must always be equal to or greater than the head height H in the upper tank 16, and in $V_{sk}$ of the skirt 32.

It is also shown in FIG. 3 that the output energy system 56 essentially includes the bi-level tank 12, the power shuttle 18 and the linear generator 24. In contrast with each other, the input energy system 54 provides an input power represented by the arrow 66, while the output energy system 56 provides an output power represented by the arrow 68. Obviously, the purpose of the present invention is to ensure that the output power 68 exceeds the input power 66. As recognized by the present invention, a valid comparison of these input and output powers 66/68 can be best understood by evaluating an operation of the displacement device 30.

Figure 4A:
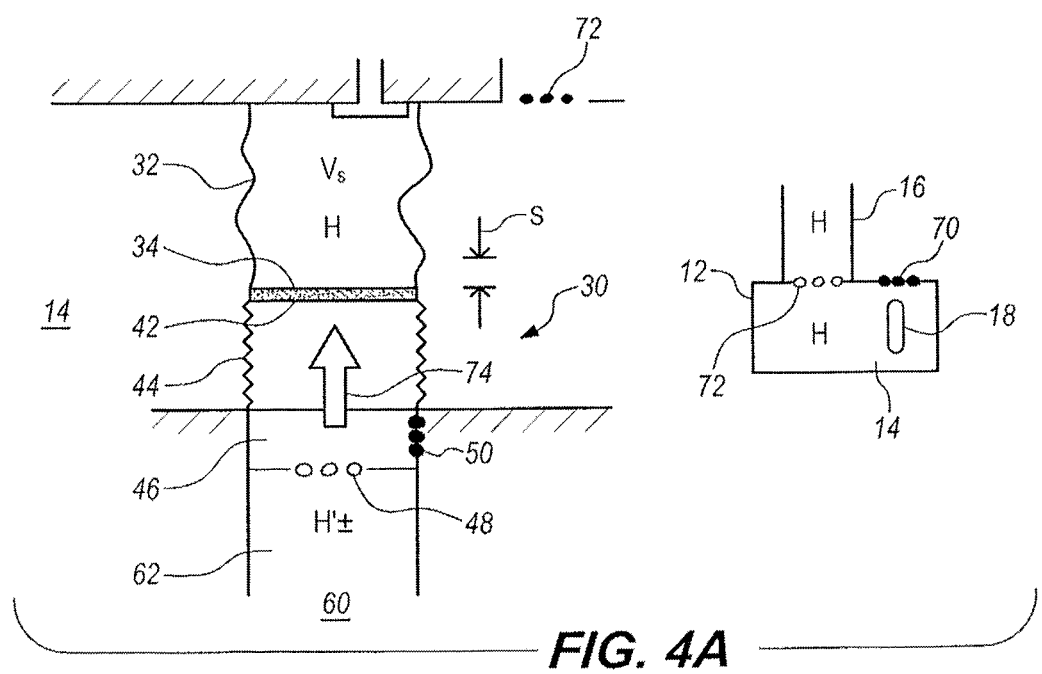
FIG. 4A-4C show sequential configurations for the displacement device during successive phases of a displacement device's duty cycle, namely, a power input phase (FIG. 4A), a holding phase (FIG. 4B), and an exhaust phase (FIG. 4C)
Figure 4B:
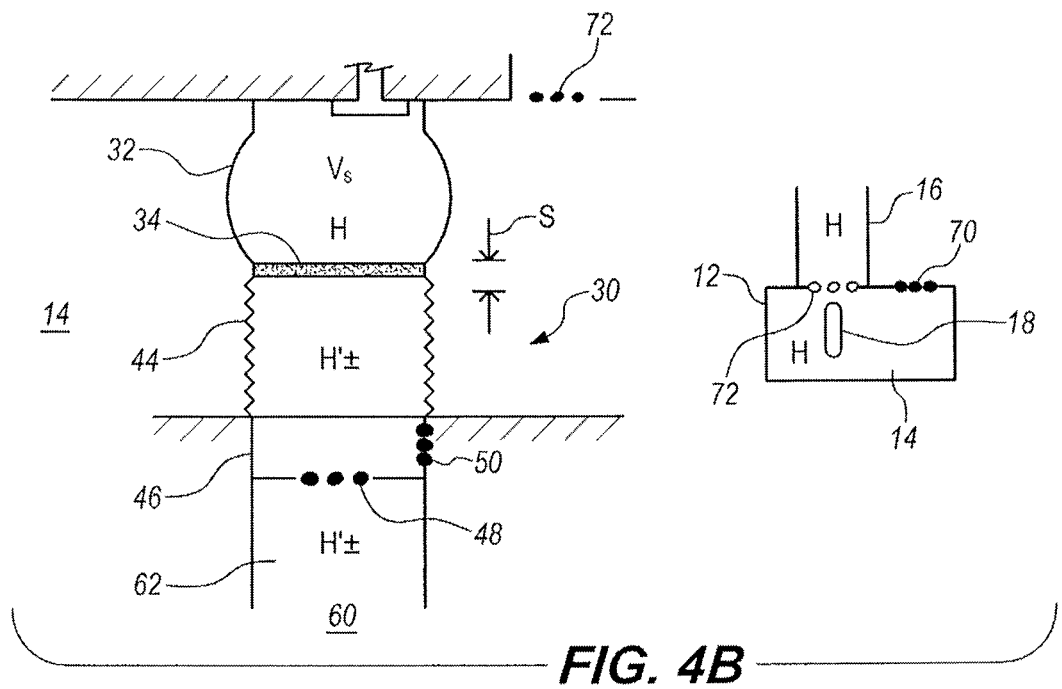
Figure 4C:
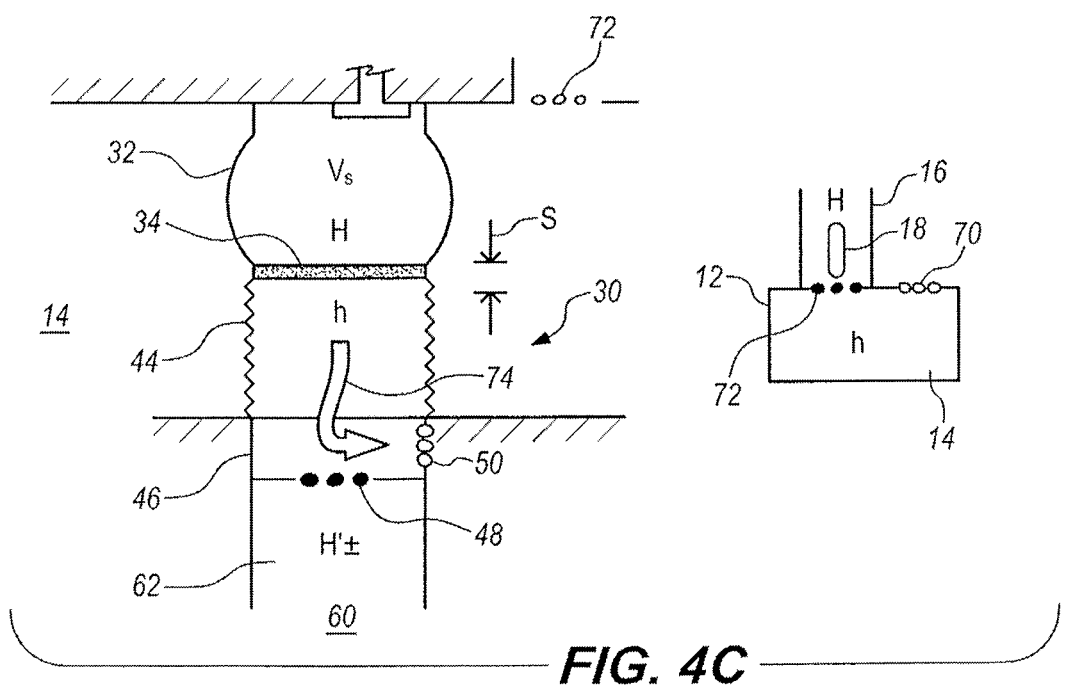

The understanding of an operation for the displacement device 30 will be best appreciated by first considering the sequence of side drawings which are shown respectively in a FIGS. 4A-C. In the side drawing of FIG. 4A, a shuttle 18 is shown immediately after it enters the lower tank 14. At this point, an access valve 70 is CLOSED behind the shuttle 18 and a transfer valve 72 ahead of the shuttle 18 is OPEN. In this configuration, water pressure in the bi-level tank 12 will equal H. In the side drawing of FIG. 4B, the shuttle 18 is shown, still in the lower tank 14, but positioned to enter the upper tank 16. The side drawing of FIG. 4C then shows conditions in the bi-level tank 12 after the shuttle 18 exits the lower tank 14 and has entered the upper tank 16. Note: it is only after the shuttle 18 has exited the lower tank 14, and the transfer valve 72 is CLOSED, that the access valve 70 is OPEN to receive the next shuttle 18 (not shown) in sequence. Importantly, to receive the next shuttle 18, with the access valve OPEN, the water pressure in the lower tank 14 has lowered from H to a single atmospheric head height "h".

With reference back to FIG. 4A, the displacement device 30 is shown configured at a time $t_0$ to begin a displacement device 30 duty cycle $\Delta t$. For this configuration, at the time to the exhaust valve 50 of the exhaust chamber 46 is CLOSED and the pressure valve 48 is OPEN. The consequence of this is that a pulse of compressed air 74 (shown as an arrow) enters the bellows 44 from the receiver tank 60 via the conduit 62, at a pressure H'±. As disclosed above, H'±>H. Thus, the resultant pressure differential causes the piston plate 34 to be moved upwardly through the distance s.

FIG. 4B shows the displacement device at a time $t_1$ in the duty cycle $\Delta t$. At the time $t_1$, the piston plate 34 has been raised through the distance s, and through a volume equal to sA=$V_w$. Two important changes in the configuration of the displacement device 30 have occurred between the times to and $t_1$ which are particularly noteworthy. For one, the skirt 32 has been radially expanded. In effect, this expansion displaces a volume of water equal to sA=$V_w$ in the lower tank 14. For another, the pressure valve 48 is CLOSED at the time $t_1$. Indeed, both the pressure valve 48 and the exhaust valve 50 need to be held CLOSED at the same time during the interval of time from $t_1$ to $t_2$. The reason here is that between the times $t_1$ and $t_2$ the piston plate 34 must be held stationary, and not lowered, until after the shuttle 18 has cleared the transfer valve 72 and is completely inside the upper tank 16. It is important to note that between $t_1$ and $t_2$, while the piston plate 34 is held stationary, no work is done.

As shown in FIG. 4C, at the time $t_2$ in the duty cycle $\Delta t$ of the displacement device 30, the exhaust valve 50 is OPEN while the pressure valve 48 remains CLOSED. With the exhaust valve 50 OPEN, and the pressure valve 48 CLOSED, the pulse of air 74 under the piston plate 34 is exhausted into the atmosphere. As this pulse of air 74 is exhausted from the exhaust chamber 46, the effect is for air pressure under the piston plate 34 to immediately lower from the pressure H'± to the much lower atmospheric pressure h at the time $t_3$. In review, it is important to note that the piston plate 34 essentially does no work from the time $t_1$ to the time $t_3$ in the duty cycle $\Delta t$ of the displacement device 30.

Figure 5:
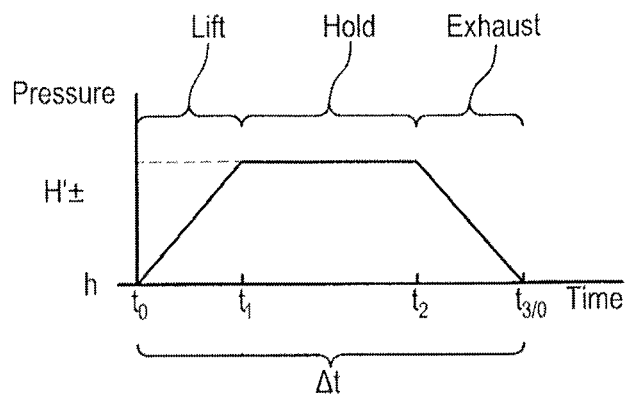
FIG. 5 is a graph of the pressure profile of compressed air against the underside surface of the piston plate during a displacement device duty cycle Δt.

For a review of the air pressures against the underside 42 of the piston plate 34, FIG. 5 shows the variations in these air pressures during a duty cycle $\Delta t$ of the displacement device 30. With reference to FIG. 5, recall that the duty cycle $\Delta t$ begins at to when the shuttle 18 enters the lower tank 14 and pressure in the tank equals h. The work portion of the duty cycle $\Delta t$ extends only during the time between $t_0$ and $t_1$ while the piston plate 34 is being raised to lift a volume of water equal to sA=$V_w$. It is this lifting action that causes the skirt 32 to expand radially and thereby displace the volume of water equal to sA=$V_w$. In this action, the skirt 32 is merely an intermediary that functions to transfer a predetermined volume of compressed air from the receiver tank 60 into a displacement volume of water in the lower tank 14. In this transfer, the work done by the piston plate 34 merely reconfigures the skirt 32 for its intended purpose. It is with this reconfiguration that a volume of water equal to sA=$V_w$ is displaced from the lower tank 14 into the upper tank 16. It must be appreciated that all of the work done between the receiver tank 60 and the lower tank 14 begins at the air compressor 58.

Figure 6A:
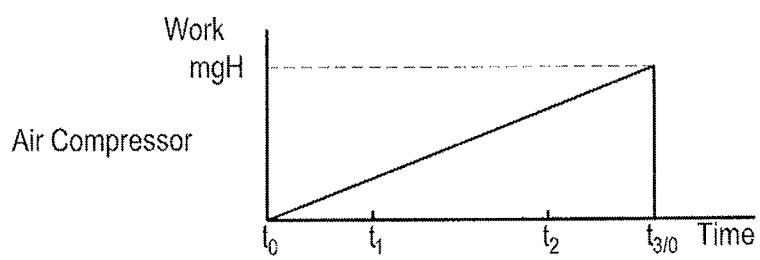
FIGS. 6A-6C show the respective power requirements for work done during a displacement device duty cycle Δt, namely, work done by the air compressor to maintain a pressure H'± in the receiver tank (FIG. 6A), work required by the piston plate to lift a predetermined volume of water $\Delta V_w$ (FIG. 6B), and the work harvested from a power shuttle (FIG. 6C)
Figure 6B:
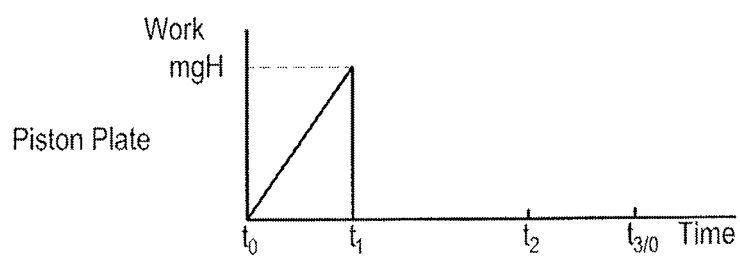
Figure 6C:
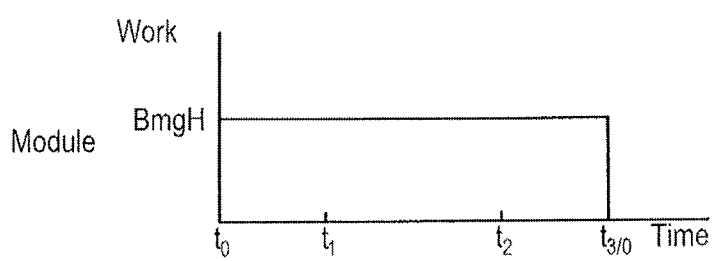

A breakdown of the work done by individual components of the displacement device 30 is shown sequentially in FIGS. 6A-C. With cross reference back to FIG. 5, FIG. 6A shows that the air compressor 58 effectively works continuously during the duty cycle $\Delta t$, starting from the time to and ending at the time $t_{3/0}$, wherein the subscript 3/0 is used to indicate the end of one duty cycle $\Delta t$ and the beginning of the next sequential duty cycle $\Delta t$. During this time, the air compressor 58 does mgH worth of work with an input power 66 equal to mgH/$\Delta t$.

FIG. 6B shows that the piston plate 34 also does mgH worth of work. But the piston plate 34 does all of its work within a portion 1/x of the work cycle $\Delta t$ at a power equal to mgH/1/x$\Delta t$. With reference to FIG. 6C, it is seen that during a duty cycle $\Delta t$ the shuttle 18 has been engaged with the linear generator 24. Considering its buoyancy factor B, the shuttle 18 has generated an output power 68 equal to BmgH/$\Delta t$.

A power comparison between the output power 68 and the input power 66 of the Machine 10 will be best appreciated by considering the specific power that is, and is not, required during the duty cycle Δt.

At the time to, the start time of a duty cycle Δt, the receiver tank 60 of the displacement device 30 holds compressed air at a pressure H'±. With the pulsing of a volume of compressed air $V_c$ from the receiver tank 60 during the first interval ½Δt, the power to raise the piston plate 34 is equal to mgH/½Δt. After the first pulse, however, no more work is done by the piston plate 34 for the remainder of the duty cycle Δt. It is important to remember that the work 1/xmgH has been done by the air compressor 58 during each interval ½Δt within the duty cycle Δt. On the other hand, from a power perspective, during the entire duty cycle Δt, the piston plate 34 receives an input power 66 from the receiver tank 60 that is equal to mgH/Δt. Stated differently, the piston plate 34 does the same amount of work, mgH, during the pulse, ½Δt, as it does during the entire duty cycle Δt. Accordingly, the input power 66 requirement from the receiver tank 60 for the Machine 10 can be compared with ½mgH/1/xΔt.

Figure 7:
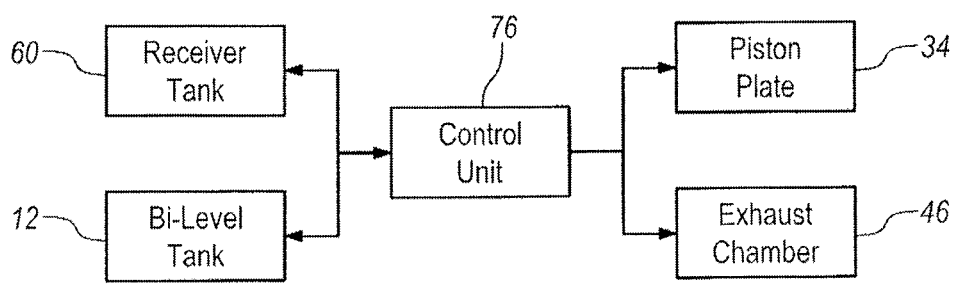
FIG. 7 is a diagram of the Machine components that are monitored and operated by a control unit for the present invention.

With reference to FIG. 7, an operation of the Machine 10 is controlled by a control unit 76. As shown for this purpose, the control unit 76 is electronically connected with the receiver tank 60, the exhaust chamber 46, and the piston plate 34, to provide the input power 66 for the input energy system 54 of the Machine 10. Specifically, the control unit 76 is connected in a two-way communication with the receiver tank 60 and the air compressor 58 to thereby maintain a compressed air pressure of H'± in the receiver tank 60 during successive duty cycles Δt. Further, the control unit 76 provides direct control over the pressure valve 48 and the exhaust valve 50 of the exhaust chamber 46. Also, the control unit 76 provides direct control over the piston plate 34, via the exhaust chamber 46, to coordinate an operation of the displacement device 30 with an operation of the bi-level tank 12.

FIG. 7 also shows that the control unit 76 is in two-way communication with the bi-level tank 12, primarily for the purpose of monitoring the transit of a power shuttle 18 along the air/water pathway 20. More specifically, by monitoring movements of the piston plate 34, and its movements that determine the duty cycle Δt of the displacement device 30, the control unit 76 controls the respective water levels of the lower tank 14 and the upper tank 16. With this control, the output power 68 is maintained for the input energy system 54.

Referring again to FIG. 3, the power requirements for an operation of the Machine 10 of the present invention will be best appreciated when the input energy system 54 and the output energy system 56 are first considered separately.

Figure 8A:
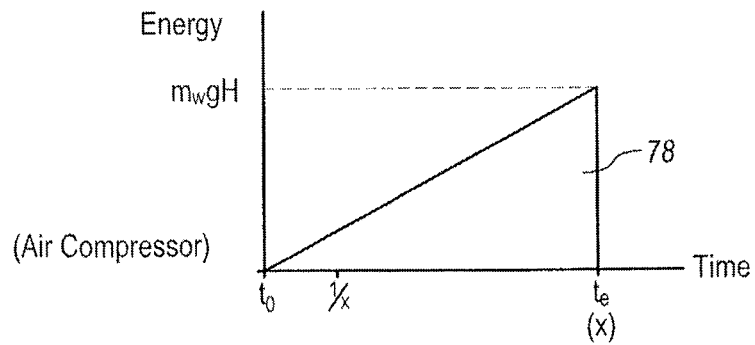
FIG. 8A is a graphical presentation of energy accumulation provided to a receiver tank from an air compressor during a duty cycle $t_e$ lasting X seconds.
Figure 8B:
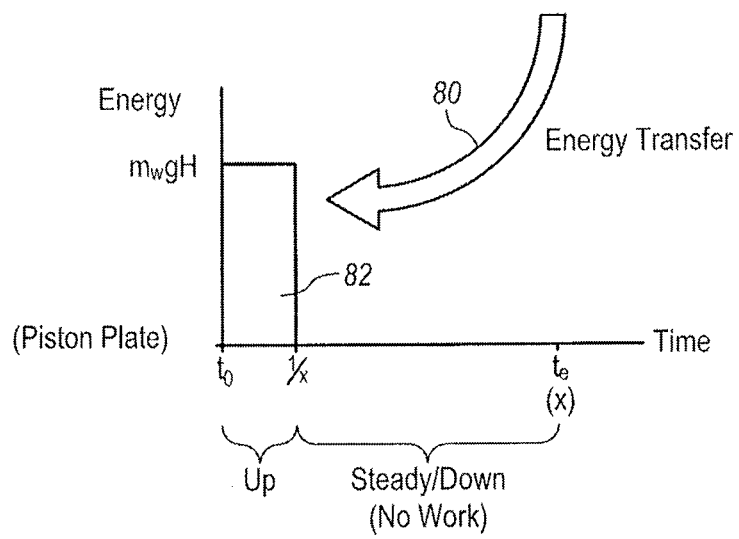
FIG. 8B is an illustration of an energy burst of compressed air from the receiver tank against a piston plate during an X second duty cycle $t_e$.

FIG. 8A and FIG. 8B consecutively show the generation and expenditure of input power $P_i$ required for driving the Machine 10. Noted above, the magnitude of the potential energy PE for the power $P_i$ equals $m_w gH$ (where $m_w$ is the mass of water in a volume equal to the volume of a shuttle 18). As indicated in FIG. 8A, $P_i$ is generated with cumulative energy 78 from the air compressor 58 over an extended duty cycle $t_e$. The energy of $P_i$ is then stored in the receiver tank 60 as compressed air. For disclosure purposes, $t_e$ will last an X number of seconds. Accordingly, on the timeline of FIG. 8A, one second is represented as 1/x.

The transfer of compressed air energy from the receiver tank 60 to the piston plate 34 is operationally controlled by the displacement device 30. This energy transfer is indicated by the transfer arrow 80 which interconnects FIG. 8A with FIG. 8B. At this point, it is important to appreciate that the $t_e$ duty cycle shown in FIG. 8B immediately follows the $t_e$ duty cycle of FIG. 8A. Furthermore, unlike the cumulative generation of $P_i$ from the air compressor 58 shown in FIG. 8A, FIG. 8B indicates that the displacement device 30 releases $P_i$ against the piston plate 34 as an instantaneous burst 82 of compressed air 74.

Figure 9:
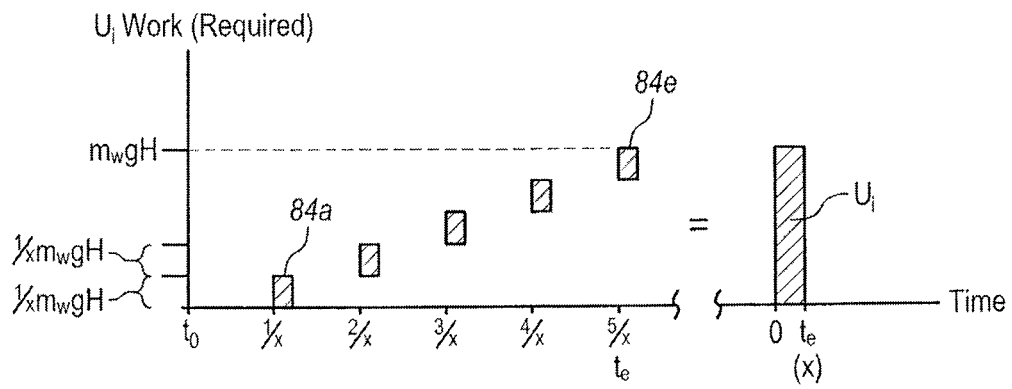
FIG. 9 is an exemplary representation of the required input work $U_i$ accumulated from an air compressor every second during an X second duty cycle $t_e$ for subsequent use by the piston plate during the next consecutive duty cycle $t_e$.

With reference to FIG. 9, the input work $U_i$, which is done respectively by both the air compressor 58 and the piston plate 34, is shown in a time sequence of two successive duty cycles $t_e$. In the first duty cycle $t_e$, the work done by the air compressor 58 is shown as a plurality of energy increments 84a through 84e. With this in mind, consider a duty cycle $t_e$ of X seconds for the air compressor 58, with a fixed work requirement of $m_w gH$. For this consideration, each energy increment 84a-e will be generated in respective time segments of 1/x seconds, with each increment 84a-e having a value of $1/xm_w gH$. Thus, for each successive (next) duty cycle $t_e$, the available work for the piston plate 34 will equal $\Sigma 1/xm_w gH$ from the first duty cycle, which equals $m_w gH$.

In FIG. 8B the burst 82 of compressed air 74 is shown to have power with an energy of $m_w gH$ that is expended over a time interval of 1/x second(s), or less, within the duty cycle $t_e$. The fact that the piston plate 34 can accomplish its entire work requirement, $m_w gH$, within the duty cycle $t_e$, is of paramount importance for an operation of the Machine 10. Specifically, during the remainder of the duty cycle $t_e$ after the piston plate 34 has been raised, it can be held stationary and then lowered to accommodate operations of the shuttle 18, with no additional work requirement.

Figure 10:
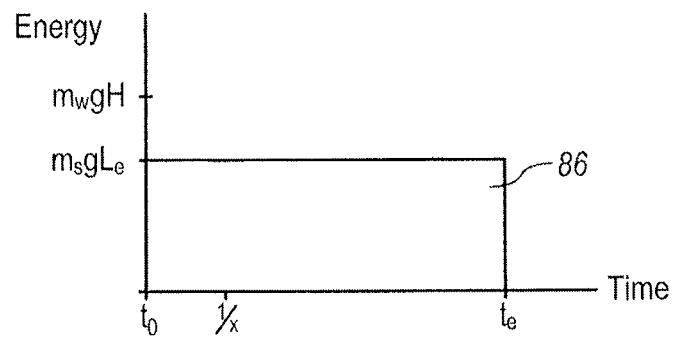
FIG. 10 is a graphical presentation of the energy constantly available from a shuttle during an X second duty cycle $t_e$.
Figure 11:
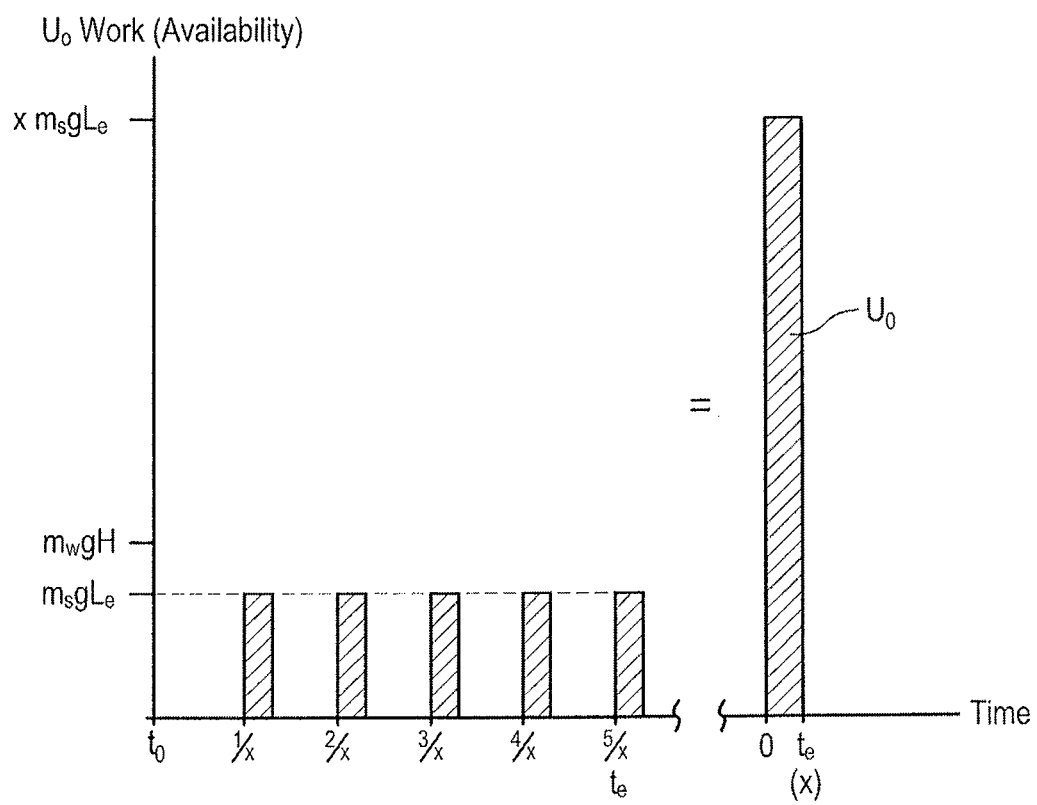

When considering the power of the output energy system 56, recall that the output energy system 56 must be considered separately from the input energy system 54. Specifically, unlike the power of the input energy system 54, the output power $P_o$ of the output energy system 56 is based on the kinetic energy KE of the module/shuttle 18, $\frac{1}{2} m_s v_e^2$. Thus, as shown in FIG. 10, this output kinetic energy KE is a constant energy 86 and it is continuously available during the duty cycle $t_e$, for each energy increment 84a-e. As implicit in FIG. 10, because the shuttle 18 has a constant velocity $v_e$ during its engagement with the linear generator 24, the constant energy 86 has a value of $\frac{1}{2} m_s v_e^2$ for each energy increment 84a-e. A consequence of the availability of constant energy 86 over the duty cycle $t_e$ is shown in FIG. 11. There it is shown that at any time during the duty cycle $t_e$ the module/shuttle 18 provides a work capability of $\frac{1}{2} m_s v_e^2$.

A total output power requirement $P_o$ for the Machine 10 will have two work components. One is the input work $U_i$ required by the pneumatic elements to operate the displacement device 30 of the input energy system 54 to accommodate the movement of the shuttle 18 on its circuit 88 through the bi-level tank 12. Importantly, $U_i$ is completely expended within the operation of the Machine 10 and thus provides no harvestable output power.

The other component of the output power $P_o$, earlier referred to as the output energy system 56, involves work done by the shuttle 18, which is harvestable. N.B. for purposes of the Machine 10, this second component is exclusively provided by the earth's gravitational field, i.e. the force of gravity. Importantly, this second component is commercially determined and is a power $P_{com}$ that is typically expressed in watts, e.g. 100 KW. Mathematically, for the Machine 10, $P_{com}$ is equal to $\frac{1}{2} m_s v_e^2/\text{sec}$.

Figure 13A:
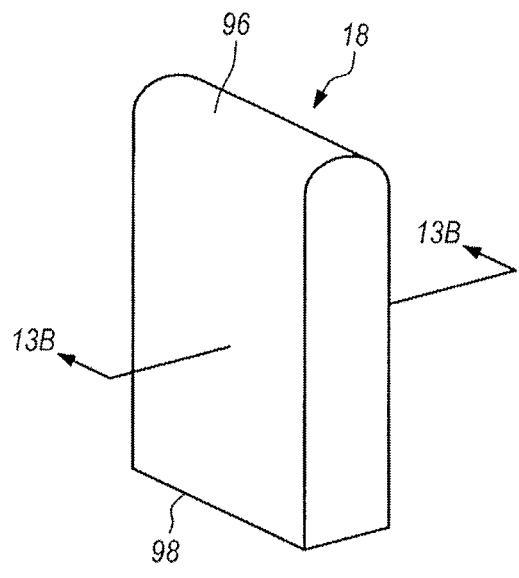
FIG. 13A is a perspective view of an exemplary shuttle.

Regarding the commercially harvestable power $P_{com}$, several structural aspects of the shuttle 18 and its use are important. In FIG. 13A, the shuttle 18 is shown as a generally rectangular prism. This shape is only exemplary. Several physical characteristics of the shuttle 18, however, are noteworthy. Specifically, the shuttle 18 is buoyant. The degree of its buoyancy is identified by a buoyancy factor B that is numerically expressed as the ratio of the shuttle's weight $W_s$ to the weight of a volume of water that is equal to the volume of the shuttle 18; $B=W_s/W_w$.

As envisioned for the present invention, a shuttle 18 with the shape shown in FIG. 13A will remain upright as it traverses the circuit 88. Further, it is recognized that for hydrodynamic reasons the upper end 96 of the shuttle 18 will need to have different drag characteristics than its bottom end 98. Specifically, this is so because as the shuttle 18 enters the lower tank 14 of the bi-level tank 12 it is desirable for the shuttle 18 to be quickly decelerated to zero velocity. Thus, the shape and texture of the bottom end 98 needs to be engineered with a drag coefficient $C_{Db}$ to maximize this requirement. On the other hand, as the shuttle 18 rises in the upper tower tank 16, it is desirable for the shuttle 18 to quickly accelerate to its terminal velocity $v_t$. Moreover, it is necessary for $v_t$ to be sufficient for the shuttle 18 to breach onto the elevated launch point 28 upon completion of a circuit 88. Thus, the shape and texture of the upper end 96 needs to be engineered with a drag coefficient $C_{Du}$ to maximize these requirements.

Figure 13B:
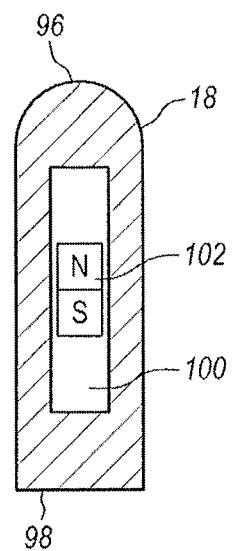
FIG. 13B is a cross section view of the shuttle as seen along the line 13B-13B in FIG. 13A.

The interior of a shuttle 18 is shown in FIG. 13B. Importantly, a hollow 100 is provided to establish the buoyancy factor B for the shuttle 18. Also, when the output energy system 56 of the Machine 10 is designed with an electromagnetic linear generator 24, a permanent magnet 102 will be mounted in the hollow 100.

Figure 14:
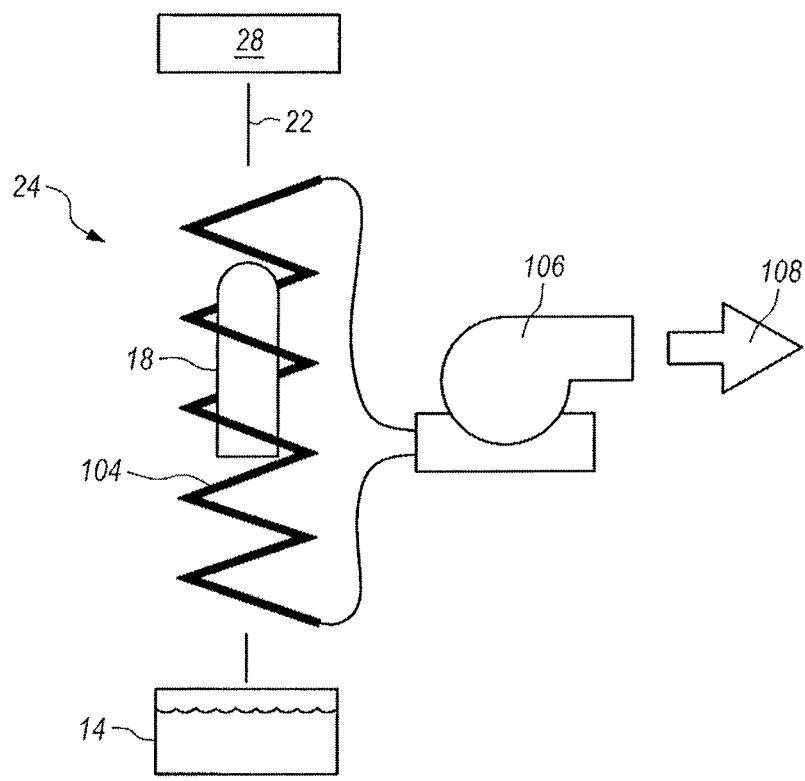
FIG. 14 shows the combination of components for an electromagnetic version of a linear generator for the present invention.

Referring to FIG. 14, for a preferred embodiment of the Machine 10 an electromagnetic linear generator 24 will include a coil 104 that extends vertically between the elevated launch point 28 and the lower tank 14 of the bi-level tank 12. Specifically, the coil 104 is positioned to receive and surround the shuttle 18 as the shuttle 18 falls under the influence of gravity from the launch point 28. As shown, the linear generator 24 is electrically connected with a rotary generator 106. With this connection the KE of the shuttle 18 uses an interaction between the permanent magnet 102 on the shuttle 18 and the coil 104 to generate power for operating the rotary generator 106, to thereby provide $P_{com}$ indicated by arrow 108.

A mathematical statement of the energy and power considerations for a Machine 10 is provided below.

The Output System (Shuttle Descent)

The output power $P_o$ of the Machine, i.e. work per second ($U_o$/sec), will typically be commercially predetermined. $P_o$ is a good starting point for designing the Machine 10, and it is typically expressed in terms of KW, i.e. joules per second. Stated differently, $U_o$/sec is a frequency at which $U_o$ can be generated, i.e., the shuttle 18 will do $U_o$ work every second.

Because the shuttle 18 of the Machine 10 is a moving object, the output work $U_o$ that is to be done can be expressed in terms of either its Potential Energy (PE) or Kinetic Energy (KE).

PE=KE $Bm_w gL_e = \frac{1}{2}m_s v_e^2$

In the above expressions, B is a buoyancy factor that relates the mass of the shuttle 18, $m_s$, to the mass, $m_w$, of an equivalent volume of water. The buoyancy factor B is introduced here to underscore the important fact that for an operation of the Machine 10 its output work $U_o$ is dependent on the shuttle 18 mass, $m_s$, whereas the input work $U_i$ for running the Machine 10, disclosed below, is dependent on a water mass $m_w$. Thus:

B=shuttle mass/water mass=$m_s/m_w$; and $Bm_w=m_s$

With specific consideration of the work/energy relationships provided above for shuttle 18, g is the acceleration due to gravity, $L_e$ is the distance through which the shuttle 18 is engaged with the linear generator 24, and $v_e$ is the constant engagement velocity necessary to generate the output power ($U_o$/sec). An additional consideration is, $t_e$, the time of this engagement. In their mathematical relationship with each other:

$v_e = L_e/t_e$

These variables $v_e$, $L_e$ and $t_e$ need to be reconciled within the operational context of the Machine 10. Of the three, $t_e$ is considered a more critical design consideration for several reasons. For one, it establishes the time required for a shuttle 18 to complete its transit through the lower transfer tank 14, after the shuttle 18 has disengaged from the linear generator 24. N.B. as a design variable, and depending on operational requirements, $t_e$ can be selected equal to an arbitrary X number of seconds. From a power perspective, the output power per second for the shuttle 18 is expressed mathematically as:

$P_o = U_o$/sec

The output power from the shuttle 18 for a time interval $t_e$ of X seconds will then be expressed as:

$P_o = XU_o/X$ sec

Other factors for consideration in the design of the Machine's output system 56, in addition to those given for power generation, include the distance $L_f$, which represents the distance a shuttle 18 must free fall from a start point with zero velocity, to attain the engagement velocity $v_e$ required to do the shuttle's desired output work $U_o$. Mathematically, $L_f$ can be calculated with the expression:

$L_f = v_e^2/(2g)$

Additional factors to be considered after the shuttle 18 disengages from the linear generator 24 include the time $t_d$ and the distance $L_d$ the shuttle 18 experiences as it dives into the lower transfer tank 14 and decelerates to zero velocity. The significant forces acting on the shuttle 18 during its deceleration from $v_e$ to zero velocity in the lower transfer tank 14 are the shuttle's weight $W_s$, its buoyant force $F_B$, and its drag force $D_b$ in water. For use in calculating $t_d$ and $L_d$, the drag force $D_b$ is mathematically expressed as:

$D_b = \frac{1}{2}\rho S v^2 C_{Db}$

Where $\rho$ is the density of water, S is the flat plate area of the shuttle's lower end, v is velocity, and $C_{Db}$ is the coefficient of drag for the lower, bottom end of the shuttle 18. If y(t) is the position of the shuttle 18 measured downward from its release from the linear generator 24, the values for $t_d$ and $L_d$ can then be determined by numerically integrating the nonlinear differential equation of motion:

$m_s d^2y/dt^2 = W_s(1-1/B) - D_b$

The Output System (Shuttle Ascent)

As indicated above, $t_e$ is also the time required for a module/shuttle 18 to transit through the lower transfer tank 14 and into the upper tower tank 16 after its disengagement from the linear generator 24. Thus, the time interval $t_e-t_d$ must be sufficient for the shuttle 18 to accelerate and exit the lower transfer tank 14.

The rise of the shuttle 18, under the influence of its buoyancy B, from its point of zero velocity at the bottom of the lower transfer tank 14 to the point of zero velocity at the top of the upper tower tank 16, the shuttle 18 rises vertically through a distance equal to H. Specifically, H is the head height of water in the tower tank 16. Note: the distance the module/shuttle 18 travels after its breach from the tower tank 16 is considered negligible. Thus, in essence, H for the ascent of shuttle 18 will approximately equal its descent distance which is the sum of the free fall distance, $L_f$, which is required for the shuttle 18 to attain $v_e$, plus the shuttle's engagement distance $L_e$ with the linear generator 24:

$$H=L_f+L_e$$

During an ascent of the module/shuttle 18, there are two considerations of paramount importance. These are: i) shuttle 18 time in the lower transfer tank 14; and ii) attainment of a terminal velocity $v_t$ for the module/shuttle 18 in the upper tower tank 16. Regarding i), starting with zero velocity at the bottom of the lower transfer tank 14, the shuttle 18 must completely exit from the lower transfer tank 14 within a time interval equal to $t_e-t_d$. This time interval is essential so the lower transfer tank 14 can be reconfigured for the arrival of the next sequential shuttle 18. Regarding ii), while in the upper tower tank 16, the shuttle 18 must attain a terminal velocity $v_t$ that is sufficient for it to breach at the top of the upper tower tank 16.

The significant forces acting on the shuttle 18 during its acceleration from zero velocity to a terminal velocity $v_t$ in the upper tower tank 16 are the shuttle's weight $W_s$, its buoyant force $F_B$ which is now its prime motive force, and its drag force $D_u$ in water. For use in calculating $v_t$:

$$F_B=+\rho g V_w \text{ and,}$$

$$D_u=-\tfrac{1}{2}\rho S v_t^2 C_{Du}.$$

Where, $\rho$ is the density of water, $V_w$ is the volume of the water displaced by the shuttle 18, S is a flat plate area, $v_t$ is a terminal velocity for the shuttle 18, and $C_{Du}$ is a coefficient of drag for the upper end 96 of the module/shuttle 18. If y(t) now equals the position of the module/shuttle 18 measured upward (not slanted) from its lowest point in the lower transfer tank 14, the time of ascent for the module/shuttle 18 can be obtained by numerically integrating the nonlinear differential equation of motion:

$$m_s d^2y/dt^2 = W_s(1/B-1)-D_u$$

Input System

Regarding the Machine's input system 54, as noted above, $t_e$ also establishes the respective duty cycles for an operation of the air compressor 58, the receiver tank 60, and for the displacement device 30. Together, these components provide the Machine's work for its input power $P_i$ requirement. Although these components operate individually, and can be considered individually, they must also be considered in combination. Moreover, they must all be considered doing their respective work during a same common time interval $t_e$.

Input System (Piston Plate)

The input work U required for the input system 54 is determined by the potential energy PE of a volume of water having a volume equal to that of the module/shuttle 18. Thus:

$$PE_{water}=PE_{shuttle}/B.$$

For comparison purposes, the respective work requirements for the piston plate 34 and the shuttle 18 are:

$$U_i(\text{piston plate})=m_w gH$$

$$U_o(\text{shuttle})=m_s gL_e.$$

From an energy perspective, the significant difference in the above energy expressions is that the input energy is greater than the output energy, and it always will be. From a power perspective, however, as addressed below, this energy imbalance is overcome.

For the input system 54, consider the input work $U_i$ is accomplished by a piston plate 34 with an upper surface 40 having an area A. The force required for $U_i$ can then be expressed in terms of a pressure $p_u$ against the upper surface 40. Specifically, where the piston plate 34 needs to be moved through a distance "s" in the direction of the applied pressure, the input work $U_i$ required is:

$$U_i=p_u As=m_w gH$$

For evaluation purposes it is to be noted that the input energy considerations have been based on PE. Accordingly, the energy value for $U_i$ is not time dependent. Instead, it is position dependent and, as such, it is a unitary requirement that can be accomplished over any time interval. The time interval of interest for the present invention is $t_e$. Thus, the work requirement for the input energy system 54 is expressed as:

$$U_{net}=U_o-U_i$$

But, as shown below, $U_o=U_i$ within the input system 54. Stated differently, once the piston plate 34 has been lifted, the input system 54 has completed its work $U_o$.

Input System (Receiver Tank)

The receiver tank 60 is basically an air tank for holding a large volume of compressed air at an elevated pressure. Specifically, for purposes of the present invention, the receiver tank 60 will maintain compressed air at a pressure equal to H'±. The interpretation of this notation, H'±, is that although its value is variable (±), H'± must always be greater than H.

With input work $U_i$ in mind, the upper surface 40 of the piston plate 34 for the Machine 10 will always be subject to a downward pressure of $m_w g/A$, which is dependent on H. The work to be done when moving the piston plate 34 upward is to raise a predetermined volume of water $V_w$ through a predetermined distance s. To do this, a pressure differential is required between a higher pressure $p_L$ against the underside 42 of the piston plate (due to H'±), and a lower pressure $p_u$ against the upper surface 40 (due to H). A positive pressure differential $\Delta p=p_L-p_u$ does this. For the present invention, where the higher pressure comes from the receiver tank 60 and is based on H'±, and assuming A is the same for both the upper surface 40 and the underside 42 of the piston plate 34, the work imbalance for moving the piston plate 34 upward is:

$$U_{net}=p_L As - p_u As$$

As noted above, an operation of the piston plate 34 is independent of time. Stated differently, the piston plate 34 needs to be raised only once during a duty cycle, $t_e$, with no other time limitation. However, for operational purposes, the piston plate 34 should be raised quickly and early in a duty cycle. In the event, the work $U_i$ that is required to lift the piston plate 34 can be done almost instantaneously with a burst 82 of compressed air from the receiver tank 60. For the remainder of the duty cycle $t_e$, the piston plate 34 can be held stationary and then dropped to exhaust compressed air from below the piston plate 34. N.B. when resetting the piston plate 34 for the next duty cycle, no work is done either as the piston plate 34 is held stationary or when air is exhausted from below the piston plate 34.

Input System (Air Compressor)

An air compressor 58 is connected to the receiver tank 60 to maintain compressed air in the receiver tank 60 with a PE energy level equal to $m_w gH^*$. From a power perspective the air compressor 58 uses the entire duty cycle, $t_e$, to accomplish its work requirement. Thus, for an X second duty cycle the air compressor 58 needs to generate $1/x(m_w gH)$/sec. For the X second duty cycle, however, the input power $P_i$ required from the air compressor 58 is equal to the input power $P_i$ for the input system 54.

$$U_i = (X \text{ sec}) 1/x(m_w gH)/\text{sec} = m_w gH$$

Machine Operation (Power/Work Comparisons)

In summary, with a time interval of X seconds for the duty cycle $t_e$ the net power available from the Machine 10 will be:

$$P_{net} = P_o - P_i$$

On a per second basis:

$$P_o = U_o/\text{sec} = [\tfrac{1}{2} m_s (v_e)^2]/\text{sec} \text{ (use commercial rating)}$$

$$P_i = U_i/\text{sec} = 1/x(m_w gH)$$

From a work perspective, and for X seconds of work, $$U_o = X[\tfrac{1}{2} m_s (v_e)^2]$$

$$U_i = X(1/x)(m_w gH)/t_e = m_w gH$$

Thus, during each duty cycle $t_e$ (where $t_e$=X seconds):

$$U_{net} = U_o - U_i$$

$$U_{net} = X[\tfrac{1}{2} m_s v_e^2] - m_w gH$$

In a preferred embodiment of the present invention, it is envisioned that a plurality of shuttles 18 can be employed in tandem. Within this plurality, timing between the shuttles 18 is a key consideration.

Figure 12:
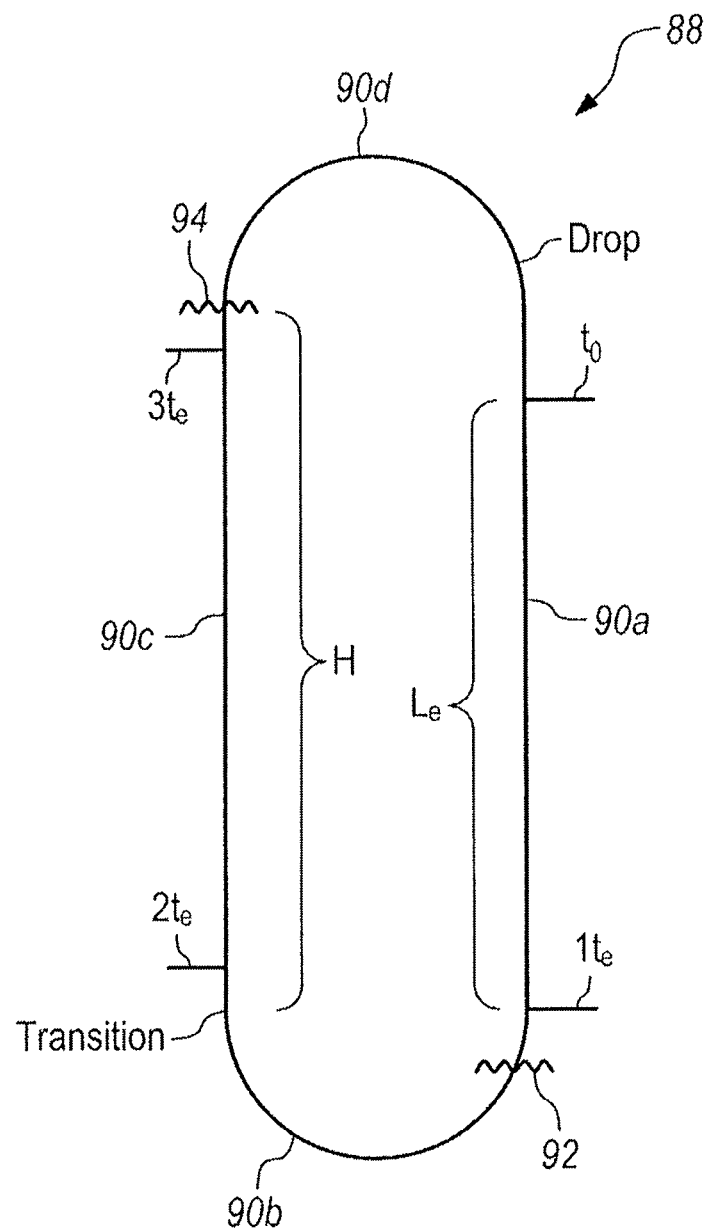

For example, in FIG. 12 a multi-shuttle version of the Machine 10 with four shuttles 18 is considered where all shuttles 18 travel on a shuttle circuit generally designated 88. As shown, the circuit 88 is divided into four time zones 90a-d. These time zones 90a-d are equal to each other in time duration only. Further, the time zones 90a-d are successive and they are aligned along the entire length of the shuttle circuit 88. Thus, shuttle circuit 88 includes both air and water pathways. Importantly, regardless of the medium the shuttle 18 is traveling in, the time duration for each time zone 90a-d is equal to $t_e$, i.e. the time of engagement between the shuttle 18 and the linear generator 24.

In sequence, the first time zone 90a is defined while the shuttle 18 is engaged with the linear generator 24 and it will extend from the time $t_0$ to time $1t_e$. Successive time zones 90 can then be defined relative to locations within the bi-level tank 12. For instance, the second time zone 90b begins at the time $1t_e$ when the shuttle 18 disengages from the linear generator 24. Time zone 90b will then continue as the shuttle 18 dives through the lower water level 92 of the bi-level tank 12 and traverses the lower transfer tank 14. Time zone 90b ends at the time $2t_e$, which is after the shuttle 18 has entered the upper tower tank 16. During, the third time zone 90c, the shuttle 18 remains in the upper tower tank 16 until the time $3t_e$ as it accelerates to its terminal velocity, $v_t$. The fourth time zone 90d is important because its duration may be somewhat controlled, i.e., it can be shortened or extended to precisely control the start time for each shuttle 18 at the beginning of a successive first time zone 90a onto the circuit 88. Also, in the fourth time zone 90d it is important that $v_t$ is sufficient for the shuttle 18 to breach from the upper water level 94 at the top of the upper tower tank 16. After breach, the remainder of the fourth time zone 90d can then be controlled, as noted above, for the next successive shuttle 18 to begin its circuit 88.

A numerical example is provided below for an application of the mathematical statement set forth above. This summary example is intended for disclosure purposes only. Thus, it is merely indicative of a method for designing and evaluating a Machine 10.

This example begins with the selection of an intended output power $P_{net}$, i.e., a commercial expectation. For this purpose, it is considered here that a 100 KW Machine would have commercial interest. For computation purposes, expressions set forth in the mathematical statement above are used for calculating numerical values for such a Machine. Where necessary, values have been selected that are considered realistic for the intended operation of the Machine. These selections are shown below bracketed in bold, e.g. [bold].

Step 1: Define the Power Balance and Calculate the Weight $W_s$ of the Shuttle.

In the expression below, $P_o$ is a total output power requirement for the Machine, $P_i$ is the input requirement for operating the pneumatic system of the Machine, and $P_{com}$ is the commercial power that is to be provided by the Machine for commercial use. Specifically, $P_{com}$ is the power generated by the KE of the shuttle. In this example $P_{com}$=100 KW.

Converting KW to ft-lb/sec $$P_{com} = 100 \text{ KW} = 73{,}756 \text{ ft-lb/sec}$$

Equating $P_{com}$ to the KE of the shuttle $$P_{com} = \tfrac{1}{2} m_s v_e^2 / \text{sec}$$

Let [$v_e$=50 ft/sec], and [$L_e$=300 ft] which gives [$t_e$=6 sec] Where $m_s = W_s/g$ $$P_{com} = \tfrac{1}{2}(W_s/32.2)(50)^2/\text{sec} = 38.82 W_s \text{ ft-lb/sec} = 73{,}756 \text{ ft-lb/sec}$$

$$W_s = 73{,}756/38.82$$

$$W_s = 1{,}900 \text{ lbs}$$

Step 2: Calculate the Shuttle Volume
Shuttle volume $V_s$=water volume $V_w$. And, therefore;

$$W_w = W_s/B$$

$$W_w = 1900 \text{ lb}/0.7 = 2714.29 \text{ lb}$$

With water density $\rho_w$=62.4 lbs/ft³

$$V_s = 2714.29 \text{ lb}/62.4 \text{ lbs/ft}^3 = 43.5 \text{ ft}^3$$

Step 3: Calculate the Head Height H of the Tower Tank.

$H = L_f + L_e$ $L_f = v_e^2/2g$ $L_f = (50)^2/64.4 \text{ ft} = 38.82 \text{ ft}$ $H = 38.82 + 300 = 338.82 \text{ ft}$ Step 4: Calculate the Input Work $U_i$ Required to Operate the Machine.

Recall, $U_i$ is based on the potential energy (PE) required to lift a water volume equal to the volume of the shuttle through the distance H. Moreover, $U_i$ is independent of time and it will have the same constant value for each shuttle cycle regardless of the time interval, $t_e$, during which the shuttle is engaged with the linear generator. The buoyancy factor B is an engineered ratio of shuttle mass, $m_s$, to water mass, $m_w$. N.B. the $U_i$ calculated here is the entire work done by the pneumatic system of the present invention, both by the air compressor and by the piston plate in the displacement device. It is the only input work $U_i$ that is required by the Machine.

$U_i = m_w g H$ $m_w = m_s/B$

Where [B=0.7], $m_w = W_w/g$, and $m_s = W_s/g$ $W_w = W_s/B$ $W_w = 1900/0.7 = 2714 \text{ lbs}$ $U_i = W_w H = (2714)338.82 = 919,654 \text{ ft-lb}.$ Step 5: Calculate the Net Work Output, $U_{net}$, for the Machine $U_{net} = U_o - U_i$ Consider that $U_i$ (pneumatic system) and $U_o$ (shuttle system) are respectively accomplished over a same X second time interval. Recall, $U_i$ is time independent, and it will be accomplished only once during a duty cycle for each shuttle. The work that is accomplished per time interval will therefore vary inversely with X. Accordingly;

During an X second time interval,
$U_i = 1/xU_i$ during each second,
and $U_i = \Sigma 1/xU_i$ for an entire X second time interval.
Moreover, during an X second time interval, $\Sigma 1/xU_i$ will be accomplished over a distance H. Thus,
$1/xU_i$ is accomplished during every second through a distance $1/xH$.
The consequence here for X seconds of work is $U_i = (2714 \text{ lb})(338.82 \text{ ft}) = 919,558 \text{ ft-lb}$ $U_i$ however, is accomplished in intervals of W seconds, and for each $1/x$ seconds,
$U_i$ will equal (>6)919,558 ft-lb=153,259 ft-lb during each second.
On the other hand, $P_o$, by definition, is 73,700 ft-lb per second. Thus, $U_o = U_0$ during each second.
Comparing totals over an X second time interval (i.e. $t_e$)
The total $U_o = XU_o$, and
The total $U_i = X(1/x)U_i$
Step 6. Conclusion for X Seconds of Work $U_{net} = XU_o - X(1/x)U_i$ $U_{net} = X(73,700) - (X)1/x(153,259).$ $U_{net} = 6(73,700 \text{ ft-lb}) - (153,259 \text{ ft-lb})$ $U_{net} = 442,200 \text{ ft-lb} - 153,259 \text{ ft-lb} = 288,941 \text{ ft-lbs}$ $U_{net}/U_i = 288,941/153,259 = 1.89$ While the System and Method for Balancing Operational Systems of an Electric Generator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for managing work requirements for a machine to generate electric energy which comprises:
   a kinetic energy (KE) system, wherein the kinetic energy system includes a shuttle having a mass, $m_s$, which is dropped from a start point for engagement with a linear generator for travel therewith through a vertical distance $L_e$ at a constant velocity, $v_e$, to continuously generate energy with an output power $P_o$ equal to $\frac{1}{2}m_s v_e^2$/sec during a duty cycle $t_e$ of x seconds duration, and wherein the total output work available is $U_o$ total=$P_o(t_e)$=$[(\frac{1}{2}m_s v_e^2/\text{sec})](x \text{ sec})$=$x(\frac{1}{2}m_s v_e^2)$;
   a potential energy (PE) system for returning the shuttle to the start point after its duty cycle, wherein the potential energy system includes a pneumatic displacement device with an air compressor for cumulatively generating compressed air for the potential energy PE needed to lift a water volume of mass $m_w$ through a vertical distance H under the influence of gravity g with an input power $P_i$ equal to $(1/x)m_w gH/\text{sec}$, and for thereafter exhausting compressed air from the potential energy system during the duty cycle wherein the total input work $U_i$ required to be done by the potential energy system during the duty cycle $t_e$ is $U_i=[(1/x)(m_w gH/\text{sec})][x \text{ sec}]=m_w gH$;
   a bi-level tank positioned to interact between the KE system and the PE system, wherein the bi-level tank is reset by the pneumatic displacement device of the PE energy system during each duty cycle $t_e$ wherein this reset is completed by a breach of the shuttle from the bi-level tank to maintain the integrity of the water volume in the bi-level tank for successive shuttle circuits; and
   a control unit connected to the kinetic energy system and to the potential energy system, to maintain a total $U_{o(total)} > U_i$ when $U_i$ has been completely expended during each duty cycle to generate a net electric energy output.

2. The system of claim 1 wherein the displacement device comprises:
   an air compressor operating with an input power $P_i$;
   a receiver tank connected to the air compressor for receiving compressed air therefrom to maintain a compressed air pressure therein sufficient to do the work $U_i$; and
   a piston plate in contact with the water column for receiving a burst of compressed air therefrom to do the work $U_i$ for lifting the piston plate during each duty cycle.

3. The system of claim 1 wherein the linear generator of the KE system comprises:
   an elongated conductor coil oriented to establish a vertical air pathway for the shuttle through the coil, wherein the air pathway has a length $L_e$; and a magnet mounted on the shuttle for generating electric energy to do the work $U_o$ as the shuttle passes through the coil with a constant velocity $v_e$ along the length $L_e$.

4. The system of claim 1 wherein x is greater than four (x>4).

5. The system of claim 1 wherein the shuttle is buoyant, and wherein the shuttle follows a closed loop circuit defined by a vertical air pathway whereon the shuttle moves under the influence of gravity and a water pathway whereon the shuttle moves under the influence of its buoyancy.

6. The system of claim 5 wherein the circuit is divided into equal time zones for coordinating and controlling the movement of the shuttle, and wherein each time zone is equal to $t_e$.

7. The system of claim 5 wherein the shuttle reaches a terminal velocity $v_t$ on the water pathway, and wherein $v_t$ is sufficient for the shuttle to breach from the water pathway and reenter the air pathway.

8. The system of claim 1 wherein the shuttle is buoyant relative to water, with a buoyancy factor B less than 1 with the shuttle volume equivalent to the water volume and the shuttle mass, $m_s = Bm_w$.

\* \* \* \* \*